United States Patent [19]

Ingram

[11] Patent Number: 4,968,166
[45] Date of Patent: Nov. 6, 1990

[54] CARPET CLEANING MACHINE WITH FOAMING CONTROL BLOCK WITH HEATER AND BRUSH

[75] Inventor: James L. Ingram, Pine Bluff, Ark.

[73] Assignee: Fragra*Matics Mfg. Co., Inc., Pine Buff, Ark.

[21] Appl. No.: 378,251

[22] Filed: Jul. 11, 1989

[51] Int. Cl.$^5$ .................. A46B 11/02; A46B 11/06
[52] U.S. Cl. ............................... 401/1; 401/2; 401/42; 401/146; 401/149; 401/289; 401/290
[58] Field of Search ................ 401/1, 2, 146, 149, 401/42, 289

[56] References Cited

U.S. PATENT DOCUMENTS

| 1,629,738 | 5/1927 | Rohne | 401/1 |
| 2,203,361 | 6/1940 | Pound | 401/1 |
| 3,163,880 | 1/1965 | Johnson | 401/1 |

FOREIGN PATENT DOCUMENTS

| 414755 | 2/1946 | Italy | 401/2 |
| 194406 | 3/1938 | Switzerland | 401/1 |
| 313946 | 7/1956 | Switzerland | 401/1 |

*Primary Examiner*—Steven A. Bratlie
*Attorney, Agent, or Firm*—Stephen D. Carver

[57] ABSTRACT

A dry foaming coin operated carpet and upholstery cleaning machine for a car washes. A rigid, generally box-like cabinet is secured in a convenient user accessible position. An elongated hose extending from the housing terminates in a user-activated brush which outputs foam and facilitates vigorous cleaning. The control circuit comprises a conventional coin mechanism which operates a timer to initiate a vend. The timer first activates an air compressor, which supplies high pressure air to the system. A remote user switch associated with the brush must be activated to thereafter activate a pump to supply cleaning solution, and to close an air solenoid for air mixing. Simultaneously a heater is activated to heat the control block disposed within the brush. A brush control block properly mixes air and cleaning solution. An elongated heater compartment preheats incoming air, which is thereafter mixed with cleaning solution and discharged through a foam generating chamber in the block. A velocity increasing orifice intercommunicates the mixing chamber with the foam generating chamber, and dry foaming is further enhanced with a sponge-like packing insert disposed within the generating chamber. Spraying is avoided to prevent dampness.

20 Claims, 4 Drawing Sheets

CARPET CLEANING MACHINE WITH FOAMING CONTROL BLOCK WITH HEATER AND BRUSH

BACKGROUND OF THE INVENTION

This invention relates broadly to carpet and upholstery cleaning machines used in the car wash industry. More particularly, the present invention relates to a non-vacuuming coin operated dry foaming carpet and upholstery cleaner for installation in the proximity of a conventional car wash bay adjacent a vacuum system. The invention is believed appropriately classified in United States Class 15, subclass 320.

As will be recognized by those with familiarity in the car wash industry, a wide variety of machines for cleaning the interior of customer vehicles exist. Many of these machines use simple vacuum suction, and some machines spray cleaning solutions concurrently with vacuuming. U.S. Pat. No. 4,194,262 issued to Finley on Mar. 25, 1980 discloses a machine which both vacuums and shampoos vehicle carpet and upholstery. An elongated hose extends from an upright, rigid enclosure to a customer operated hand tool. When the switch on the hand tool is activated, cleaning fluid is vigorously sprayed. Concurrently with the spraying of soap or cleanser, applied vacuum sucks spent cleaning solution away from the target area.

Numerous car wash devices of the latter type have been proposed. However, in my experience, the combining of cleaning fluid output with vacuum can lead to mechanical difficulties. Besides increasing the cost and bulk of the equipment, interference between the vacuum and spraying conduits can result. It has thus been suggested to separate the carpet cleaning function from the vacuuming function. For example, it is known to provide a foaming output through a brush associated with a coin operated machine so that the brush may be rubbed over the target area. As the brush is manipulated, the outputted foam results in a cleansing lather, and after the lather dries, the powder residue may thereafter be vacuumed away by a separate vacuum cleaner. In theory at least, the separate vacuuming system will be subjected only to dry or powdered wastes, and since it is not exposed to liquid soap, which can be corrosive, its own integrity may be preserved.

However, in known prior art devices, a problem exists in that too much liquid solution is usually dispensed. As a result, proper drying seldom occurs, and solution is deeply absorbed into the carpet or upholstery being cleaned. Since the applied solution seldom properly dries, corrosion and mildew can result. Additionally, such systems often leave the customer's vehicle with an undesirable smell of dampness. Even with the wet vacuum suction systems such as that described in U.S. Pat. No. 4,194,262, the volume of liquid cleaning solution discharged by such machines aggravates the dampness problem.

Hence the prior art has proposed the use of so-called dry foaming machines. In such machines a small quantity of liquid concentrate is emitted from a brush, and by appropriately agitating the area by vigorous scrubbing, dirt can thereafter vacuumed away as powder. However, I have found that conventional foaming applicators fail to correctly mix the foaming concentrate, because too much reliance is placed upon "spraying."

Known prior art dry foaming cleaning machines pump a high volume of shampoo through a cavity, and blow air through the cavity in an attempt to vigorously spray the target area. It has hitherto been thought that spraying is necessary to maintain proper foaming. Mixing typically occurs in a large cavity concurrently with spraying. I have found that vigorous spraying is unnecessary, because the user will put the brush in contact with that area to be cleaned anyway, and even a slowly dripping foam mixture will contact the area to be cleaned. Spraying also necessitates the use of too large a volume of solution, and since drying times are inadequate, dampness is unavoidable. Much of the cleaning concentrate which should be aerated tends to sink into the carpet. Dampness can result in corrosion and rust. In addition, such systems tend to waste precious cleaning concentrate, thereby inadvertently increasing operating cost to the car wash owner.

Hence I have proposed a cleaning system which vigorously and efficiently aerates the solution concentrate to maximize its "dry-foaming" ability, while minimizing the waste of liquid cleaning concentrate. My system, which readily facilitates dry-foam cleaning, minimizes the unnecessary spraying of liquid concentrate. The residue quickly dries to minimize the dampness problem.

SUMMARY OF THE INVENTION

The present invention comprises dry foaming vehicle interior shampooing machine which employs a reduced amount of cleansing solution and avoids spraying. The machine is adapted to be securely mounted adjacent conventional vacuuming machines to facilitate subsequent coin-operated vacuuming to complete cleaning.

Preferably a rigid, box-like sheet metal enclosure protectively houses the machine components, and enables the machine to be appropriately mounted. An elongated hose extending from the enclosure terminates in a remote brush system which enables the user to vigorously agitate a target area while a dry foaming cleaning mixture is relatively slowly outputted.

An air compressor disposed within the enclosure delivers air through the hose in response to a timed circuit. Concurrently a preferably Peristaltic pump sucks solution from a reservoir and transmits it through the hose to the brush. The brush includes a foam producing control block which heats both air and cleaning liquid, and vigorously foams it. Because of the foaming efficiency of the control block, reduced volumes of cleansing liquid are necessary. The brush comprises a rigid bristle plate secured to a manually operated handle system with an intermediate gasket. The control block is positioned within the housing in proper registration with an output orifice defined in the plate.

The control block comprises an elongated heating compartment in which a heating element is disposed for heating both air and liquid. The heating element is controlled by the circuit within the enclosure. Air forced into the control block passes through the heating element compartment for preheating. Thereafter it is discharged into an internal mixing chamber defined in the block, which is also in fluid flow communication with a shampoo passageway. Intersecting reduced diameter bores define the internal mixing chamber. The mixing chamber is separated from the larger volume, foam generating chamber by a reduced diameter orifice, and an increased velocity foam stream is established. Foam emitted from the blocks foam chamber is further dispersed with a sponge-like packing insert concentrically disposed within the foam chamber. When assembled, the foam chamber is pressed adjacent an O-ring against the discharge orifice defined in the bristle plate.

The circuit includes a timer which is initiated at the start of a vend. A vend may be started with the push of manual switch, by preferably it is started by a conventional coin acceptor in response to the input of a predetermined amount of coins. When the timer is actuated, a first relay activates the compressor, but a solenoid control valve interrupts air flow at this time. When the user subsequently activates the remote switch associated with the brush, a second relay activates the pump and heater system, and further closes the air pathway so that cleaning liquid and air are pumped concurrently.

Preferably low voltage is substantially employed in the circuit to minimize the potential for electric shock. The circuit further comprises a warm weather switch which disables the heater power supply when outside temperature rises, to prevent overheating. A low weather temperature sensing system activates a heater for warming the compressor when the outside temperature is too low.

Thus a broad object of the present invention is to provide a coin-operated dry foaming cleaning machine for use in car washes.

A more particular object of the present invention is to prove a dry foaming carpet and upholstery shampooing system of the character described which minimizes cleaning solution volume to prevent waste and minimize dampness.

Yet another object of the present invention is to provide a reliable carpet shampooing machine of the character described which may be readily employed in conjunction with the existing vacuum machines widely used in the coin operated car wash Industry.

A fundamental object of the present invention is to carefully meter the cleaning solution.

Another fundamental object is to provide a brush control block system in foaming cleaning machines of the character described which preheats both the mixing air and the cleaning solution.

Another basic object of the present invention is to provide a dry foaming machine of the character described which uses a low volume of liquid and thus prevents dampness.

Another object of the present invention is to reduce molding and prevent unwanted smells by minimizing dampness.

Still another object of the present invention is to prevent rusting or corrosion of the customers, automobile or truck.

These and other objects and advantages of the present invention, along with features of novelty appurtenant thereto, will appear or become apparent in the course of the following descriptive sections.

BRIEF DESCRIPTION OF THE DRAWINGS

In the following drawings, which form a part of the specification and which are to be construed in conjunction therewith, and in which like reference numerals have been employed throughout wherever possible to indicate like parts in the various views.

DETAILED DESCRIPTION

With initial reference now to FIGS. 1 through 4 of the drawings, the reference numeral 20 generally designates a dry foaming carpet cleaning system constructed in accordance with the best mode of the present invention. The cleaning machine 20 comprises a generally box-like, rigid, sheet metal cabinet 22 forming an enclosure is secured to a suitable supporting stanchion 24. An elongated, reinforced hose 26 extending from the enclosure 22 terminates in an applicator brush, generally designated by the reference numeral 28. In operation brush 28 will dispense a dry foam upon a target area 30 to be cleaned, and when the user vigorously manipulates brush 28 the outputted foaming solution will dislodge dirt and the like. When the foam subsequently dries, entrained dirt and residue may be vacuumed away.

The normally closed front door 30 of the machine includes a front surface 32 upon which suitable decals, directions, and warnings are secured. A coin admission slot 34 enables a conventional coin acceptor 43 (FIG. 12), which is secured to the inner door surface, to initiate a vend. Coins are accumulated within a coin box 36 secured at the bottom of enclosure 22. After cleaning occurs, brush 28 is stored upon a bracket 38. Bottle 39 containing shampoo is stored within the cabinet in region 40B (FIG. 2) and solution is sucked out of it by a hose 39B coupled to pump 54.

The interior 40 (FIG. 2) of the enclosure mounts the primary components of the machine. The hardware thereshown is illustrative of the schematic elements seen in FIG. 12. The conduit 41 protects the incoming electrical power wires which are routed to junction boxes 42 and 44 secured within the housing enclosure. The coin acceptance mechanism (FIG. 12) communicates with a conventional timer, generally designated by the reference numeral 46, disposed adjacent circuit modules 48A and 48B. A conventional air compressor 50 disposed at the bottom of the cabinet is employed to provide high pressure air. A conventional Mero-Matic brand peristaltic pump 54 is employed to deliver cleaning solution to the brush via a hose 56 housed within the main brush hose 26. Air is similarly supplied through an air line generally designated by the reference numeral 27 which is also disposed within brush hose 26. The hose 26 is coupled to a generally tubular fitting 29 which is secured to the brush housing 70. Tube fitting 29 is in turn secured to the cabinet by conventional threaded fitting.

As will be described in more detail hereinafter in conjunction with FIG. 12, when the coin acceptor registers the input of a predetermined coin value, timer 46 activates. The air compressor is immediately started, but a remote user operated switch 58 associated with the brush must be activated by the user to initiate foaming. When switch 58 is activated, an air solenoid delivers high pressure air out of hose 27B, and peristaltic pump 54 is started to force solution through hose 26. Pump 54 is a positive displacement pump. In the best embodiment it provides 12 to 14 milliliters of concentrate per minute, or approximately two ounces of solution in five minutes. In the best mode the shampoo disposed within bottle reservoir 39 is changed between winter and summer conditions. In the summer it comprises an anionic surfactant. In the winter during cold weather it is best to provide a non-ionic surfactant mixed with solvents comprising glycol and alcohol.

Figures 8, 11:
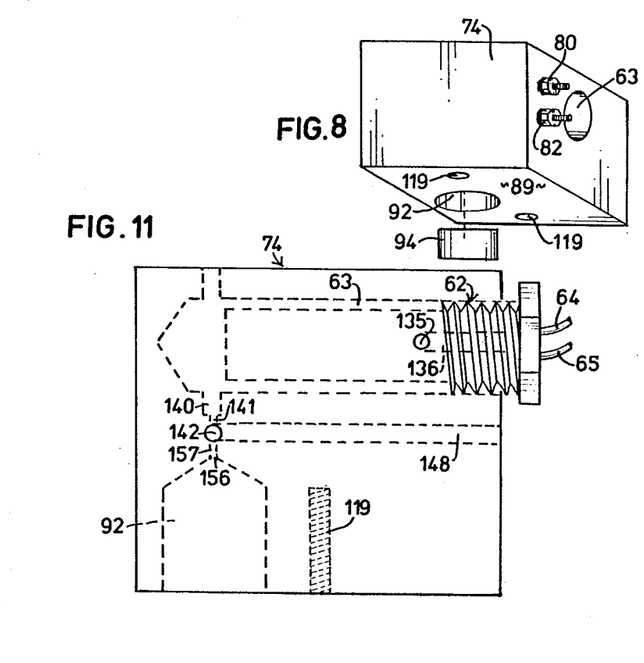
FIG. 8 is an enlarged, bottom isometric view of the control block.
FIG. 11 is an enlarged, side view of the control block with fluid passageways shown in phantom lines; and, FIG. 12 is a combined schematic and diagrammatic view of the preferred circuit.
Figure 9:
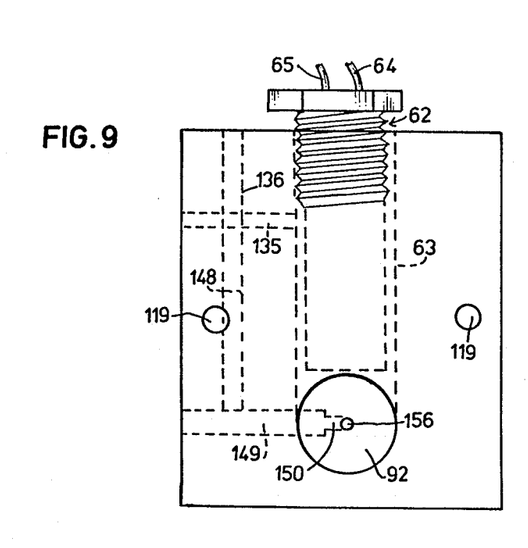
FIG. 9 is an enlarged, bottom plan view of the control block, with fluid passageways shown in phantom lines.
Figure 10:
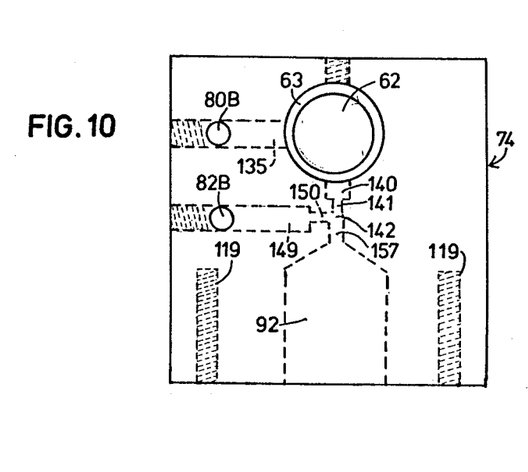
FIG. 10 is an enlarged, rear view of the control block, with fluid passageways shown in phantom lines.

When the user switch 58 is activated, a heater power supply will concurrently be activated to initiate a heater element, generally indicated by the reference numeral 62 (FIGS. 9, 11, 12), through heater input lines 64, 65. Heating of the brush assembly foaming block, to be described hereinafter, results. Thus after inputting coins, and pressing brush switch 58, cleaning can occur as foam is vigorously outputted.

As seen in FIGS. 5 through 11, it will be appreciated that the brush receives its fluids via hose 27, which shrouds the shampoo hose 56 and the air line 27B, as well as a pair of conductors 64, 65 which extend to the heating element 62. Hose 26 is secured to a generally tubular fitting 29 preferably threadably secured with fitting 29B to the brush housing 70, the heater element 62, is mounted within a rigid, generally cubical control block 74 housed within brush housing 70. Heater element 62 is threadably secured to an elongated heater compartment 63 defined in the block. The air line 27B terminates in block fitting 80, and the shampoo line 56 terminates in a shampoo fitting 82 both mounted at the block rear.

The underside 89 (FIG. 8) of the control block 74 includes a central foam generating chamber 92. Chamber 92 receives a generally cylindrically configured packing insert 94 made of sponge-like material which is concentrically inserted into chamber 92. Besides further aerating the mixture, it aids in thoroughly distributing foam.

Figure 1:
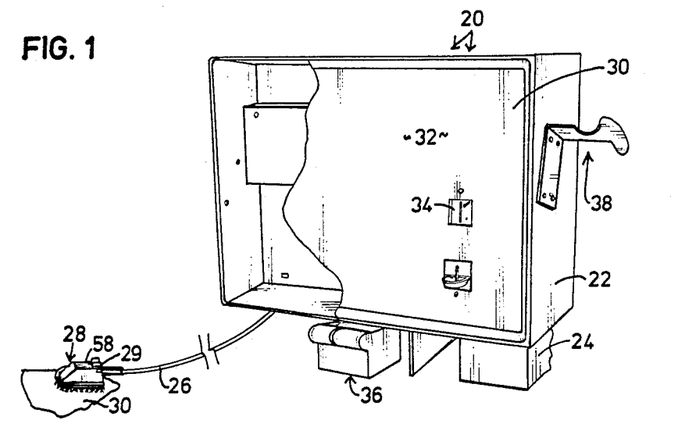
FIG. 1 is a fragmentary, isometric view of my CARPET CLEANING MACHINE WITH FOAMING CONTROL BLOCK, with portions thereof broken away or omitted for clarity.
Figure 2:
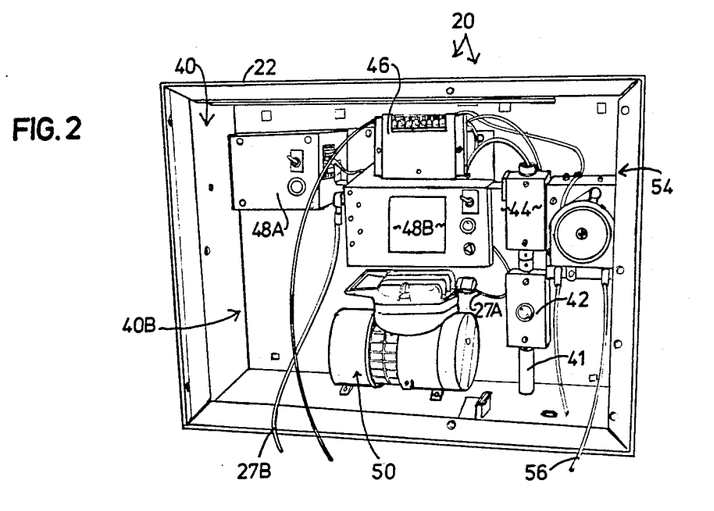
FIG. 2 is an enlarged perspective view of the open enclosure cabinet with the access door removed, illustrating the interior placement of components.
Figure 3:
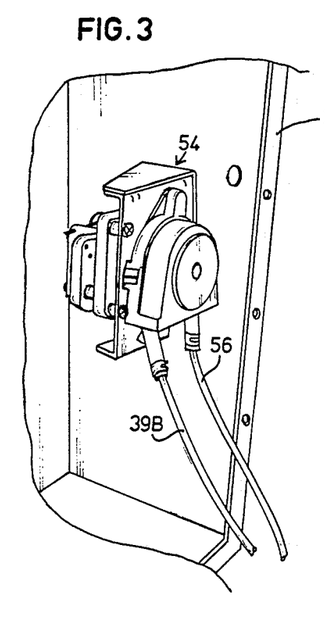
FIG. 3 is an enlarged, fragmentary, pictorial view of the preferred peristaltic pump utilized for solution control.
Figure 4:
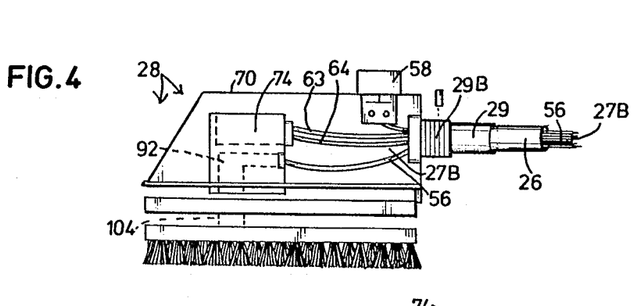
FIG. 4 is a fragmentary side elevational view of the preferred brush construction.
Figure 5:
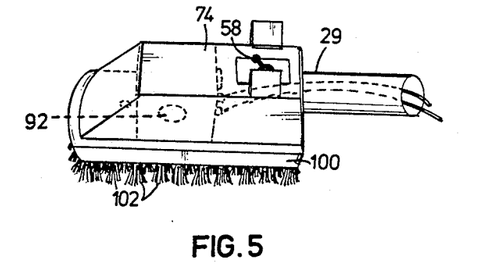
FIG. 5 is a fragmentary, isometric view illustrating the brush plate and the control block, with portions thereof broken away or omitted for clarity.
Figure 6:
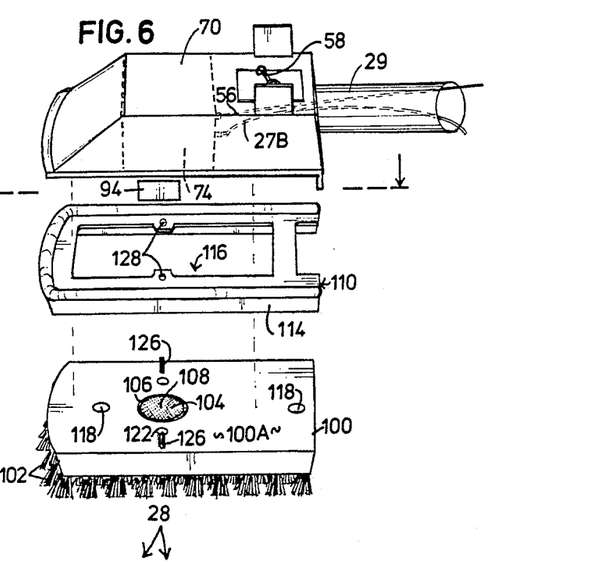
FIG. 6 is a fragmentary, exploded perspective view of the brush assembly with portions thereof omitted for clarity.
Figure 7:
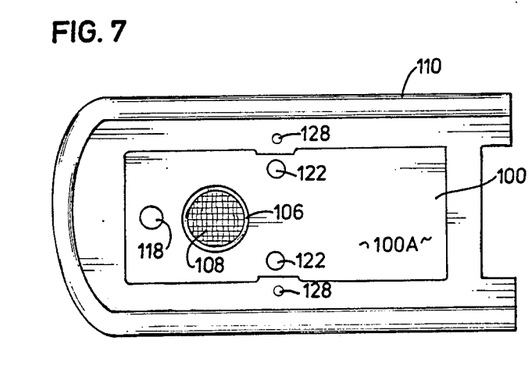
FIG. 7 is a fragmentary sectional view taken generally along line 7—7 of FIG. 6, with portions thereof omitted or broken away for clarity.

With combined reference now directed to FIGS. 4-6, the brush assembly 28 comprises a generally rectangular, rigid bristle blade 100 having a plurality of downwardly projecting bristles 102 for vigorously contacting the surface 30 to be cleaned. A central transmission orifice 104 is defined through plate 100, and it locates a circumferential O-ring 106 which mounts a wire grating 108. Grating 108 prevents the admission of oversized particles from the working environment back into block 74. Plate 100 is adapted to be fitted into the underside of the brush housing 70 with a resilient gasket, generally designated by the reference numeral 110, interposed therebetween. To this effect the upper surface 100A of the bristle plate is received within the recessed portion of the gasket defined beneath its peripheral sides 114. Gasket sides 114 also define an upper recess generally designated by the reference numeral 116 which mate to the lower surface of the brush housing 70. The plate 100 is rigidly secured to the housing 70 with conventional screws penetrating mounting orifices 118 which extend interiorly through the gasket into suitable bosses (not shown) defined in the housing underside. Block 74 includes a pair of orifices 119 (FIG. 8) defined on opposite sides of foam generating chamber 92 which enable the block to be secured directly to plate surface 100A with screws that penetrate plate orifices 122. A pair of alignment pins 126 projecting upwardly from the surface 100A of the bristle plate penetrate suitable follower orifices 128 defined in the gasket 110 for alignment. When properly assembled, the foam generating chamber 92 defined in block 74 will be compressed against gasket 106 in strict registration with transmission orifice 104 (FIG. 4, 6).

As illustrated in FIGS. 8 through 11, heating element 62 is threadably received concentrically within the elongated heater compartment 63. Air is admitted into fitting 80 which is secured into an orifice 80B. A first air passageway comprising segments 135 and 136 delivers air directly into the heater compartment 63. Air can pass through the compartment around the heating element 62, where it can exit through a second air passageway 140 terminating in a reduced diameter neck portion 141 which communicates with an internal mixing chamber 142. Shampoo fitting 82 is secured to an orifice 82B in communication with a shampoo passageway comprising segments 148 and 149. The elongated horizontally disposed shampoo passageway 148 is disposed substantially parallel to and spaced apart from the heater compartment 63. Shampoo passageway 149 (FIGS. 9, 10) terminates in a reduced diameter neck portion 150 which intersects the mixing chamber 142. Foam generating chamber 92 includes a velocity increasing, reduced diameter orifice 156 communicating with a passageway 157 which also intersects the mixing chamber 142. Preferably the diameter of the foam generating chamber 92 is approximately ten times that of the passageways 157, 150 or 141. In this fashion foam is appropriately mixed.

Figure 12:
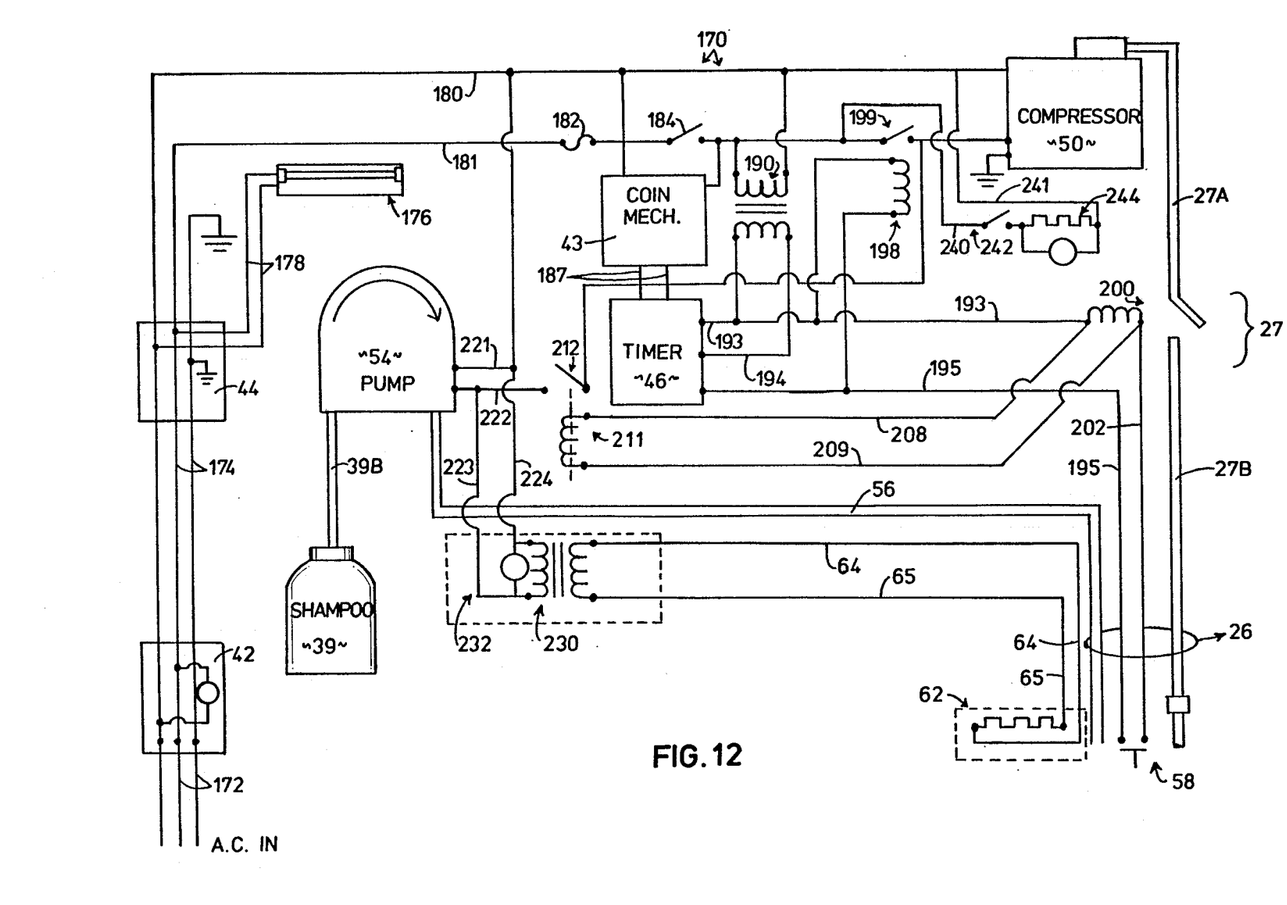

With reference now directed to FIG. 12, the control has been generally designated by the reference numeral 170. Conventional alternating current electricity is admitted through a plurality of wires 172 (housed within conduit 41, FIG. 2) which terminate in a first electrical junction box 42. Wires 174 extending to junction box 44 deliver the necessary power to circuit 170. In addition, a conventional light 176 is directly powered by lines 178, whenever line 174 are "hot". The service light 176 is disposed within the housing 22. Voltage is available across lines 180 and 181 exiting from junction box 44. A conventional fuse 182 and a owner/activated switch 184 are included for safety.

When coins are inputted to the coin mechanism 43, timer 46 is actuated via lines 187. It should be appreciated that the circuit and apparatus will function in conjunction with a wide variety of conventional coin mechanisms, or dollar bill changers. Further, the coin mechanism can be changed to a push button switch, for example, to enable use at "full service" car wash locations.

A step-down transformer 190 provides low voltage, nominally 24 volts inputted to the timer across lines 193 and 195. When activated, it outputs across lines 193 and 195. A first relay 198 connected across lines 193, and 195 immediately activates compressor 50 by closing switch 199. The compressor will output air through a line 27A, which will be closed through line 27B only when air solenoid 200 is closed. The remote user switch 58 located in the brush can be user activated to join lines 195 and 202 to energize the solenoid 200 and close the air path. However, when this occurs, power is also applied across lines 208, and 209 which activate a second relay 211 which controls the pump switch 212. Thus when switch 212 is closed, power will be available across lines 221, 222 and across lines 223 and 224. When activated thusly, the pump will suck solution through from shampoo reservoir via line 39B, and pump it out the hose 56. Of course, solution will not be pumped unless the remote user switch 58 has been activated, at which time air will be concurrently transmitted by closure of the solenoid 200.

As previously described a heater element 62 is disposed within the control block in the brush assembly. It is powered by a pair of lines 64, 65, energized by a low voltage heater transformer 230. Thus when the pump 54 is turned on by switch 212, lines 223 and 224 are energized and power is transmitted to the primary of transformer 230 through the normally closed thermal sensing switch 232. When transformer 230 is activated, heating element 62 will heat the brush control block assembly. Switch 232 is thermally activated, and when a predetermined temperature is reached it opens. Preferably it opens in a range between 90 and 100 degrees, but in the best mode it opens at 100 degrees Fahrenheit.

Thus during hot summer conditions the block will not over heat. In cold conditions it is best to heat the compressor somewhat. To this effect a pair of lines 240 and 241 are adapted to energize a compressor heating strip 244 when normally open thermal sensing switch 242 is closed. In the best mode switch 242 is selected to turn on at approximately 37 degrees fahrenheit to energize the heat strip 244 disposed inside compressor 50. The switch will remain on until the environmental temperature then exceeds approximately 45 degrees fahrenheit.

From the foregoing, it will be seen that this invention is one well adapted to obtain all the ends and objects herein set forth, together with other advantages which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A carpet shampooing machine for cleaning vehicle interiors, said shampooing machine comprising:

rigid, protective enclosure means for housing components of said machine, said enclosure means adapted to be secured to a supportive structure;

circuit means for actuating said machine;

air compressor means disposed within said enclosure means for providing high pressure air in response to said circuit means;

reservoir means disposed within said enclosure means for supplying shampoo;

pump means disposed within said enclosure means in fluid flow communication with said reservoir means for outputting shampoo from said enclosure means in response to said circuit means;

brush means for concurrently dispensing shampoo and, in response to manual manipulation, for vigorously contacting the vehicle interior to spread shampoo foam;

elongated hose means for operatively interconnecting said brush means with said enclosure means;

said brush means comprising a housing and a rigid control block operatively disposed within said housing, said control block comprising:

an elongated heater compartment;

a heating element disposed in said compartment for normally heating said block;

a first air passageway defined in said block in fluid flow communication with said heater compartment;

an internal mixing chamber defined in said block;

a shampoo passageway defined in said block in fluid flow communication with said mixing chamber;

a second air passageway extending between said heating compartment and said mixing chamber;

a foam generating chamber for outputting foaming shampoo from said block;

a velocity increasing, reduced diameter orifice establishing fluid flow communication between said foam generating chamber and said mixing chamber; and, means for initiating said circuit means to operate said machine.

2. The shampooing machine as defined in claim 1 wherein:

said shampoo passageway terminates in a reduced diameter neck portion;

said second air passageway terminates in a reduced diameter neck portion intersecting the reduced diameter neck portion of said shampoo passageway; and, said mixing chamber is defined by the intersection of said last mentioned reduced diameter neck passageway portions.

3. The shampooing machine as defined in claim 2 wherein said shampoo passageway is approximately equal in length with and parallel to said elongated heater compartment.

4. The shampooing machine as defined in claim 3 wherein said block comprises a packing insert comprised of sponge-like, foam plastic packing media disposed within said foam generating chamber for increasing the aeration of said foam.

5. The shampooing machine as defined in claim 4 wherein said foam generating chamber is at least ten times bigger in diameter than the diameter of said reduced diameter orifice.

6. The shampooing machine as defined in claim 1 wherein said circuit means is interconnected with a conventional source of A.C. electricity, and said circuit means comprises:

timer means for initiating and terminating a vend;

first relay means for electrically actuating said air compressor means in response to said timer means;

air solenoid means for establishing an air path between said compressor means and said brush means through said hose means;

heater power supply means for energizing said heating element;

pump switch means for powering said pump means and said power supply means only when said first relay means has been energized;

second relay means for actuating said pump switch means; and, remote user switch means associated with said brush means for activating said second relay means and said air solenoid means after said timer means initiates a vend.

7. The shampooing machine as defined in claim 6 wherein said heater power supply means transmits low voltage to said heating element through wires in said hose means.

8. The shampooing machine as defined in claim 6 wherein said circuit means comprises a warm weather switch for disabling said heater power supply means when the outside temperature reaches a preselected high temperature.

9. The shampooing machine as defined in claim 8 wherein said circuit means comprises means for heating said air compressor means when the outside temperature drops below a preselected low temperature.

10. The shampooing machine is defined in claim 9 wherein said preselected low temperature is within the range of 35 to 40 degrees F. and said preselected high temperature is within the range of 90 to 110 degrees F.

11. The shampooing machine as defined in claim 8 wherein said pump means comprises a peristaltic pump.

12. The shampooing machine as defined in claim 1 wherein said brush means comprises:

a rigid plate equipped with a plurality of bristles and a transmission orifice;

a housing receiving said hose means for mounting said control block, said housing including a manually operated switch for initiating foaming;

a sealing gasket interposed between said plate and said housing; and, aligning means for properly aligning said plate with said control block.

13. The shampooing machine as defined in claim 12 wherein said aligning means comprises a plurality of pins penetrating predefined orifices in said plate, housing and gasket, and an O-ring defined in said transmission orifice for sealing it in fluid flow communication with said foam generating chamber.

14. The shampooing machine as defined in claim 13 wherein:

said shampoo passageway terminates in a reduced diameter neck portion;

said second air passageway terminates in a reduced diameter neck· portion intersecting the reduced diameter neck portion of said shampoo passageway;

and said mixing chamber is defined by the intersection of said last mentioned reduced diameter neck passageway portions.

15. A coin operated, dry-foaming carpet shampooing machine for cleaning vehicle upholstery, carpeting or the like, said shampooing machine comprising:

rigid, protective enclosure means for housing components of said machine, said enclosure means adapted to be secured to a supportive structure which is conveniently accessible to customers;

circuit means disposed within said enclosure means for actuating said machine, said circuit means coupled to a conventional source of A.C. power;

money acceptor means for energizing said circuit means to initiate a vend in response to customer input of preselected monies;

air compressor means disposed within said enclosure means for providing high pressure air in response to said circuit means;

reservoir means disposed within said enclosure means for supplying shampoo;

pump means disposed within said enclosure means in fluid flow communication with said reservoir means for outputting shampoo from said enclosure means in response to said circuit means;

customer operated brush means for concurrently dispensing shampoo and vigorously contacting said vehicle upholstery, carpeting or the like;

elongated hose means for operatively interconnecting said brush means with said enclosure means; and, said brush means comprising a housing and a rigid control block operatively disposed within said housing for mixing air and shampoo, said control block comprising:

an elongated heater compartment;

a heating element disposed in said compartment for heating said block;

a first air passageway defined in said block in fluid flow communication with said heater compartment;

an internal mixing chamber defined in said block;

a shampoo passageway defined in said block in fluid flow communication with said mixing chamber;

a second air passageway extending between said heating compartment and said mixing chamber;

a foam generating chamber for outputting foaming shampoo from said block; and, a velocity increasing, reduced diameter orifice for establishing fluid flow communication between said foam generating chamber and said mixing chamber.

16. The shampooing machine as defined in claim 15 wherein said circuit means comprises:

timer means for initiating and terminating a vend;

first relay means for electrically actuating said air compressor means in response to said timer means;

air solenoid means for establishing an air path between said compressor means and said brush means through said hose means;

heater power supply means for energizing said heating element;

pump switch means for powering said pump means and said power supply means only when said first relay means has been energized;

second relay means for actuating said pump switch means; and, remote user switch means associated with said brush means for activating said second relay means and said air solenoid means after said timer means initiates a vend.

17. The shampooing machine as defined in claim 16 wherein said circuit means comprises:

a warm weather switch for disabling said heater power supply means when the outside temperature reaches a preselected high temperature;

means for heating said air compressor means when the outside temperature drops below a preselected low temperature; and, said preselected low temperature is within the range of 35 to 40 degrees F. and said preselected high temperature is within the range of 90 to 110 degrees F.

18. The shampooing machine as defined in claim 17 wherein said pump means comprises a peristaltic pump.

19. The shampooing machine as defined in claim 17 wherein:
said shampoo passageway terminates in a reduced diameter neck portion;
said second air passageway terminates in a reduced diameter neck portion intersecting the reduced diameter neck portion of said shampoo passageway; and,
said mixing chamber is defined by the intersection of said last mentioned reduced diameter neck passageway portions.

20. The shampooing machine as defined in claim 19 wherein said block comprises a packing insert comprised of sponge-like, foam plastic packing media disposed within foam generating chamber for increasing the aeration of said foam.

* * * * *